US012638152B2

(12) United States Patent
Tamura

(10) Patent No.: US 12,638,152 B2
(45) Date of Patent: May 26, 2026

(54) VEHICULAR LIGHTING TOOL AND METHOD OF MANUFACTURING VEHICULAR LIGHTING TOOL

(71) Applicant: STANLEY ELECTRIC CO., LTD., Tokyo (JP)

(72) Inventor: Hiroyuki Tamura, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 19/213,299

(22) Filed: May 20, 2025

(65) Prior Publication Data

US 2025/0362002 A1 Nov. 27, 2025

(30) Foreign Application Priority Data

May 21, 2024 (JP) ................................ 2024-082728

(51) Int. Cl.
*F21S 43/27* (2018.01)
*F21S 43/20* (2018.01)

(52) U.S. Cl.
CPC ......... *F21S 43/27* (2018.01); *F21S 43/26231* (2024.05); *F21S 43/2641* (2024.05); *F21S 2243/00* (2024.05)

(58) Field of Classification Search
CPC ................................. F21S 43/14; F21S 43/27
See application file for complete search history.

(56) References Cited

U.S. PATENT DOCUMENTS

| | | | | |
|---|---|---|---|---|
| 9,162,616 | B2 * | 10/2015 | Wu | B60Q 1/0035 |
| 10,215,360 | B1 * | 2/2019 | Grogan | F21S 43/315 |
| 2018/0313506 | A1 * | 11/2018 | Wang | F21S 43/14 |
| 2021/0222852 | A1 * | 7/2021 | Yokoi | F21S 43/14 |
| 2024/0418338 | A1 * | 12/2024 | De Lamberterie | F21S 43/14 |

FOREIGN PATENT DOCUMENTS

| | | |
|---|---|---|
| JP | 2018-106941 A | 7/2018 |

* cited by examiner

*Primary Examiner* — Eric T Eide
(74) *Attorney, Agent, or Firm* — Kenealy Vaidya LLP

(57) ABSTRACT

A vehicular lighting tool has an emission part, an inner lens located on a rear side of the emission part, and an outer lens located on a rear side of the inner lens, the outer lens has a guide convex portion and a positioning convex portion protruding forward, the inner lens has a guide hole and a positioning hole, the guide convex portion is inserted into the guide hole in a state in which a gap is provided in a leftward/rightward direction, and the inner lens is positioned in the leftward/rightward direction by the positioning convex portion being inserted into the positioning hole.

8 Claims, 13 Drawing Sheets

VEHICULAR LIGHTING TOOL AND METHOD OF MANUFACTURING VEHICULAR LIGHTING TOOL

CROSS-REFERENCE TO RELATED APPLICATION

Priority is claimed on Japanese Patent Application No. 2024-082728, filed May 21, 2024, the content of which is incorporated herein by reference.

BACKGROUND OF THE INVENTION

Field of the Invention

The present invention relates to a vehicular lighting tool and a method of manufacturing a vehicular lighting tool.

Description of Related Art

There is known a vehicular lighting tool in which rear combination lamps mounted on both corner portions on a rear end side of a vehicle and a lid lamp mounted on a back gate of the vehicle are provided side by side in a vehicle width direction (for example, see Japanese Unexamined Patent Application, First Publication No. 2018-106941).

SUMMARY OF THE INVENTION

In such a vehicular lighting tool, due to a gap between the lid lamp and the rear combination lamp, a dark section is created between a light emitting region on the side of the lid lamp and a light emitting region on the side of the rear combination lamp. Here, by positioning end portions of an inner lens of the lid lamp in a leftward/rightward direction close to an inner side surface of an outer lens, the light emitting region on the side of the lid lamp and the light emitting region on the side of the rear combination lamp are made to form a continuous light emitting region, improving the appearance of the light emission. However, when a sidewall portion of the outer lens is recessed in the leftward/rightward direction, it is difficult to dispose the inner lens in an accommodating space of the outer lens, and it is difficult to reduce a distance between the sidewall portion of the outer lens and the end portion of the inner lens.

An aspect of the present invention is directed to providing a vehicular lighting tool that can be easily assembled while ensuring widening of a light emitting surface of an inner lens in a leftward/rightward direction relative to an outer lens.

An aspect of the present invention provides the following configurations.

[1]A vehicular lighting tool located on a rear end portion of a vehicle and that is configured to emit light to a side behind the vehicle, the vehicular lighting tool including:

an emission part configured to emit light to a rear side;

an inner lens that is located on a rear side of the emission part and that is extending in a leftward/rightward direction; and an outer lens that is located on a rear side of the inner lens and that is extending in the leftward/rightward direction, wherein the outer lens includes:

a guide convex portion and a positioning convex portion that are arranged in the leftward/rightward direction and protruding forward;

sidewall portions extending forward from end portions of the outer lens in the leftward/rightward direction, respectively; and inward protruding parts protruding inward in the leftward/rightward direction from end portions of the sidewall portions on the front side, the inner lens including:

a fixing part fixed to the outer lens; and a guide hole and a positioning hole passing through the inner lens in a forward/rearward direction of the vehicle, end portions of the inner lens in the leftward/rightward direction face the sidewall portions with a gap therebetween and overlap the inward protruding parts in the forward/rearward direction, the guide convex portion is inserted into the guide hole in a state in which a gap is provided in the leftward/rightward direction, and the inner lens is positioned in the leftward/rightward direction with respect to the outer lens by the positioning convex portion being inserted into the positioning hole.

[2] The vehicular lighting tool according to the above-mentioned [1], wherein the guide convex portion is located at a first side in the leftward/rightward direction with respect to the positioning convex portion, the outer lens has a stopper convex portion located at the first side of the guide convex portion, the inner lens includes a protrusion piece that is protruding toward the inner lens in an upward/downward direction and in which the guide hole is provided, and a concave portion recessed forward is formed between the guide convex portion and the stopper convex portion.

[3] The vehicular lighting tool according to the above-mentioned [1], wherein the guide convex portion is located at a first side in the leftward/rightward direction with respect to the positioning convex portion, the guide convex portion includes:

a tip portion;

a first inclined surface located at the first side with respect to the tip portion; and a second inclined surface located at a second side, which is opposite to the first side, with respect to the tip portion, the first inclined surface is inclined in a direction toward a front side as it goes toward the first side, the second inclined surface is inclined in a direction toward a front side as it goes toward the second side, and an inclination angle of the first inclined surface with respect to the leftward/rightward direction is greater than an inclination angle of the second inclined surface with respect to the leftward/rightward direction.

[4] The vehicular lighting tool according to the above-mentioned [1], wherein the outer lens has the plurality of guide convex portions disposed on both sides in the leftward/rightward direction with respect to the positioning convex portion, and the inner lens has the plurality of guide holes disposed on both sides in the leftward/rightward direction with respect to the positioning hole.

[5] The vehicular lighting tool according to the above-mentioned [4], wherein the positioning convex portion is located at a center of the outer lens in the leftward/rightward direction, and the positioning hole is located at a center of the inner lens in the leftward/rightward direction.

[6] The vehicular lighting tool according to the above-mentioned [1], further including a housing that opens on a rear side and that accommodates the emission part, wherein the inward protruding part is welded to the housing on a front end portion of the housing.

[7] The vehicular lighting tool according to any one of the above-mentioned [1] to [6], further including:

a lid lamp mounted on a trunk lid of the vehicle having the emission part, the inner lens, and the outer lens; and a pair of rear combination lamps arranged and disposed on a right side and a left side of the lid lamp, respectively.

[8]A method of manufacturing a vehicular lighting tool that is located on a rear end portion of a vehicle and that is configured to emit light to a side behind the vehicle, the method including a lens assembly process of fixing an inner lens, which is extending in a leftward/rightward direction, to an outer lens which is located on a rear side of the inner lens and which is extending in the leftward/rightward direction, wherein the outer lens including:

a guide convex portion and a positioning convex portion that are arranged in the leftward/rightward direction and protruding forward;

sidewall portions extending forward from end portions of the outer lens in the leftward/rightward direction, respectively; and inward protruding parts protruding inward in the leftward/rightward direction from end portions of the sidewall portions on the front side, wherein the inner lens including:

a guide hole and a positioning hole passing through the inner lens in a forward/rearward direction of the vehicle, wherein the guide convex portion is located at a first side in the leftward/rightward direction with respect to the positioning convex portion, wherein the lens assembly process including:

a first process of making a first end portion, which is located on the first side of the inner lens, to face an inner side surface of the sidewall portion and inserting the guide convex portion into the guide hole in a state in which the first end portion is located on a front side of a second end portion located on a second side which is opposite to the first side, a second process of moving the second end portion to a rear side while maintaining a state in which the guide convex portion is inserted into the guide hole, and inserting the positioning convex portion into the positioning hole; and a third process of fixing the inner lens to the outer lens, wherein, in the first process, the guide convex portion is inserted into the guide hole in a state in which a gap is provided in the leftward/rightward direction, and in the second process, by inserting the positioning convex portion into the positioning hole, the inner lens is positioned with respect to the outer lens in the leftward/rightward direction.

As described above, according to the aspect of the present invention, it is possible to provide a vehicular lighting tool capable of securely widening a light emitting surface of an inner lens in a leftward/rightward direction relative to an outer lens and easily assembling them.

DETAILED DESCRIPTION OF THE INVENTION

Figure 1:
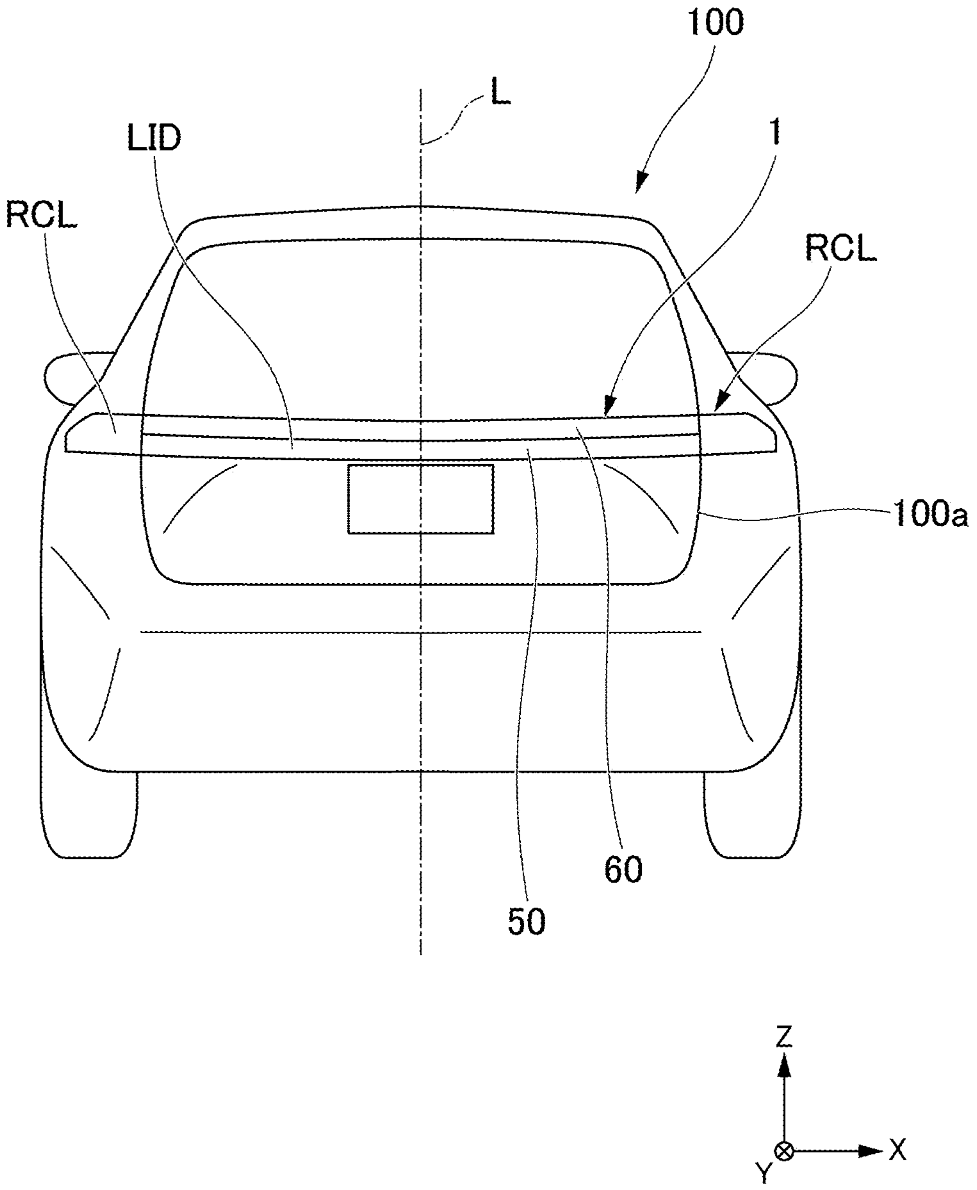
FIG. 1 is a view showing a vehicle on which a vehicular lighting tool of an embodiment is mounted when seen from behind.

Hereinafter, an embodiment of the present invention will be described in detail with reference to the accompanying drawings.

Further, in the drawings used in the following description, in order to make each component easier to see, dimensions of each component may be shown at different scales, and dimensional ratios of each component may not necessarily be the same as in reality.

In addition, in the drawings as shown below, an XYZ orthogonal coordinate system is set. A Y-axis direction is a forward/rearward direction of a vehicle 100 on which a vehicular lighting tool 1 is mounted, a +Y side is a front side, and a −Y side is a rear side. An X-axis direction is a leftward/rightward direction (vehicle width direction) of the vehicle 100 on which the vehicular lighting tool 1 is mounted, a +X side is a right side, and a −X side is a left side. A Z-axis direction is a vertical direction of the vehicular lighting tool 1, a +Z side is an upper side, and a −Z side is a lower side.

FIG. 1 is a front view showing a rear portion 60 of the vehicle 100 on which the vehicular lighting tool 1 of the embodiment is mounted when seen from behind (−Y). As shown in FIG. 1, the vehicular lighting tool 1 includes a lid lamp LID mounted on a trunk lid **100*a* of the vehicle 100, and rear combination lamps RCL mounted on both corner portions on a rear end side of the vehicle 100. The lid lamp LID and the rear combination lamps RCL are installed side by side in a leftward/rightward direction X of the vehicle 100. The vehicular lighting tool 1 is located on a rear end portion of the vehicle 100 and emits light rearward (−Y) from the vehicle 100**.

The vehicular lighting tool 1 is located on a center in the leftward/rightward direction X when seen in a forward/rearward direction Y and laterally symmetrically configured with reference to a centerline L extending in an upward/downward direction Z. In the specification, "an inner side in the leftward/rightward direction X" means a side gets closer to the centerline L in the leftward/rightward direction X, and "an outer side in the leftward/rightward direction X" means a side separating away from the centerline L in the leftward/rightward direction X.

Figure 2:
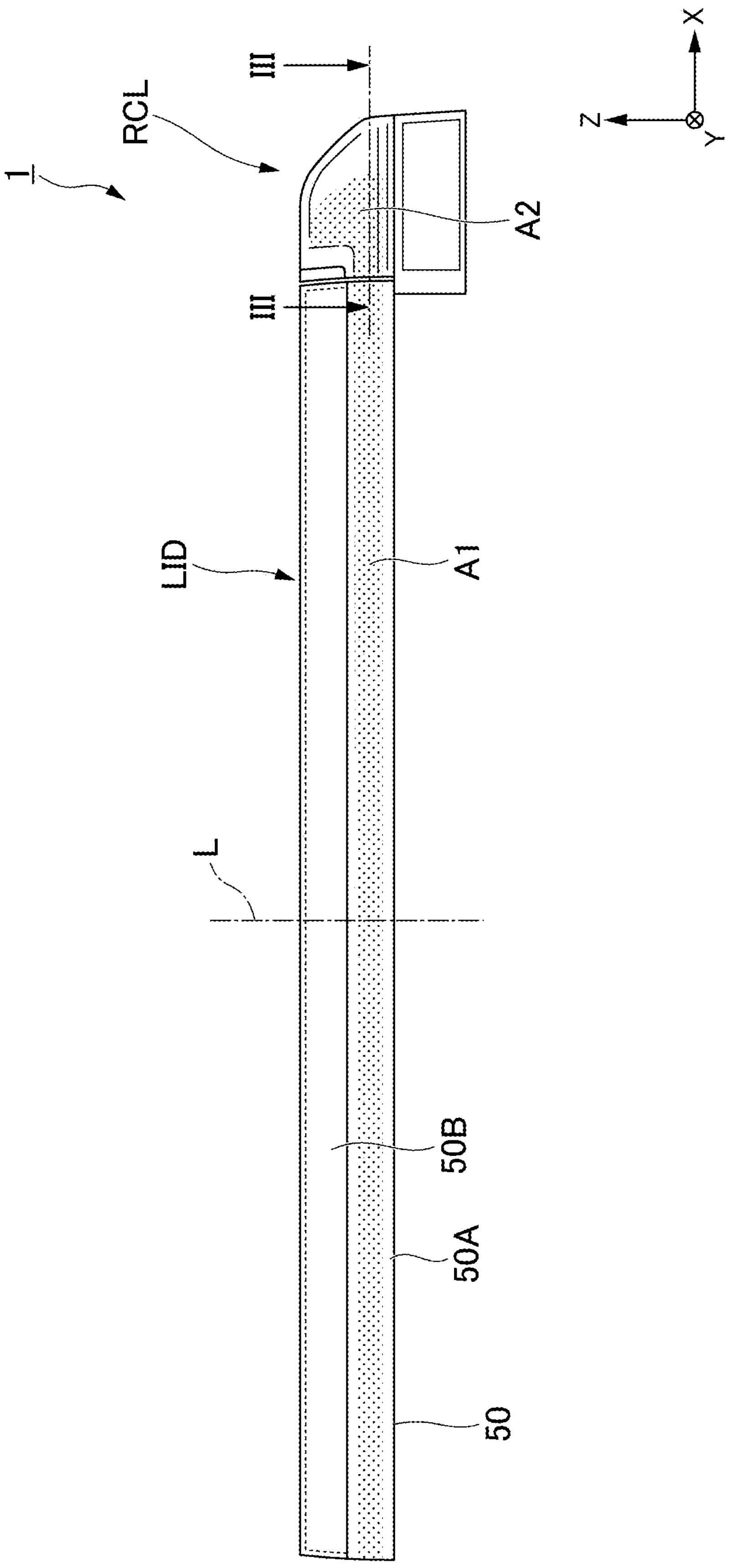
FIG. 2 is a view showing a lid lamp and a rear combination lamp of the embodiment when seen from behind.

FIG. 2 is a front view showing the lid lamp LID and the rear combination lamp RCL located on a right side of the lid lamp LID when seen from behind (−Z). In FIG. 2, a light emitting region A1 of the lid lamp LID and a light emitting region A2 of the rear combination lamp RCL are shown as dot patterns.

The light emitting region A1 extends linearly with a uniform width in the leftward/rightward direction X. In addition, the light emitting region A2 extends outward in the leftward/rightward direction X with the same width as the width of the light emitting region A1 from a boundary portion between the light emitting region A1 and the light emitting region A2. In addition, the light emitting region A2 has a larger width at its outer end portion in the leftward/rightward direction X.

In the vehicular lighting tool 1, in a state in which the trunk lid 100*a* is closed, the light emitting regions A1 and A2 emit light extending in the leftward/rightward direction X.

Figure 3:
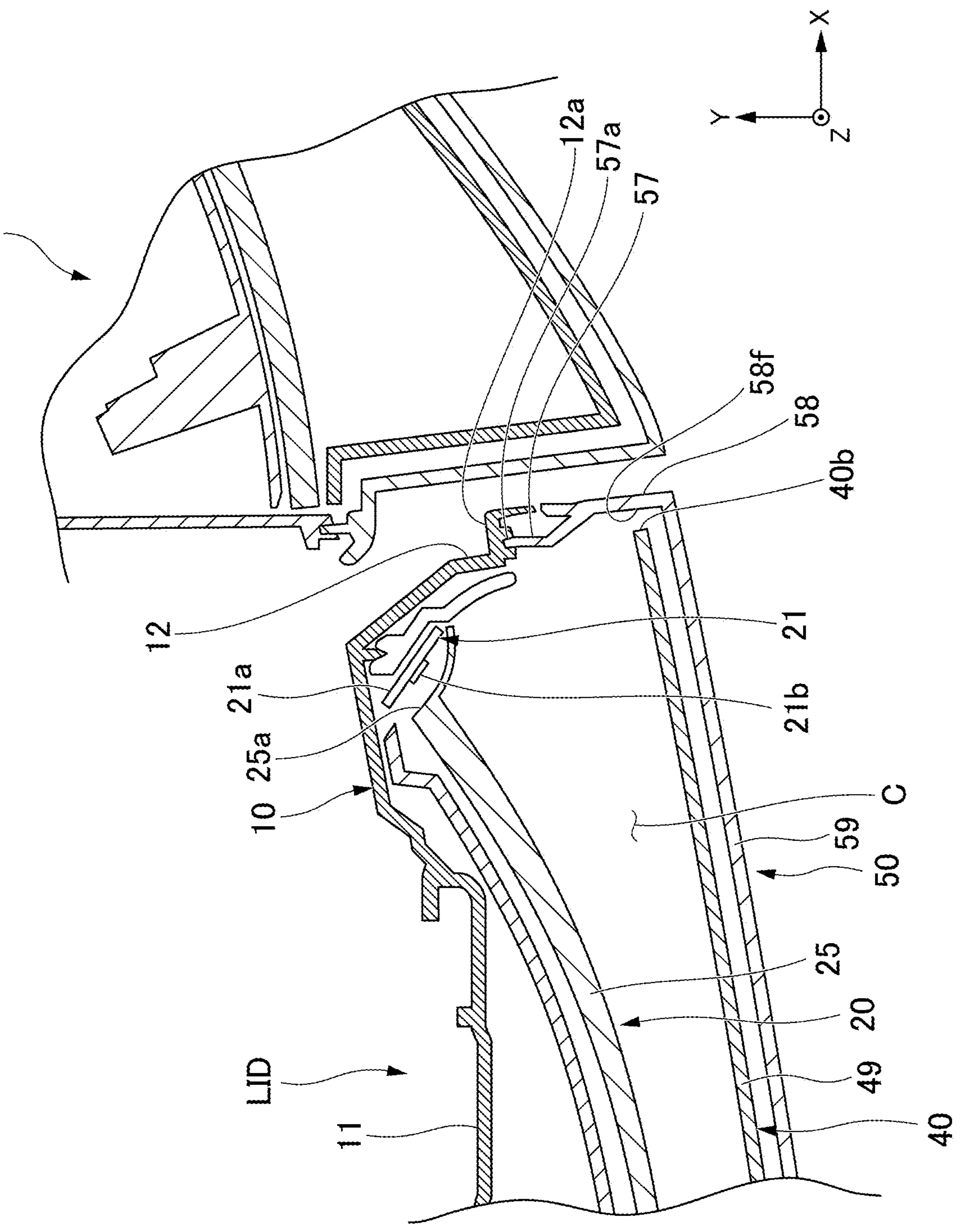
FIG. 3 is a cross-sectional view of the vehicular lighting tool along line III-III in FIG. 2.

FIG. 3 is a cross-sectional view of the vehicular lighting tool 1 along line III-III in FIG. 2. Further, in FIG. 3, while an end portion of the lid lamp LID at the right side (+X) and the rear combination lamp RCL at the right side (+X) are shown, an end portion of the lid lamp LID at the left side (−X) and the rear combination lamp RCL at the left side (−X) also have the same structure when inverted in the leftward/rightward direction X.

The lid lamp LID has a housing 10, an emission part 20, an inner lens 40, and an outer lens 50. The housing 10, the emission part 20, the inner lens 40, and the outer lens 50 are disposed in this order from the front side (+Y) toward the rear side (−Y).

The housing 10 is fixed to the vehicle 100. The housing 10 has a bottom wall portion 11 extending along a plane perpendicular to the forward/rearward direction Y, and a frame-shaped portion 12 protruding from the bottom wall portion 11 to the rear side (−Y). Accordingly, the housing 10 opens to the rear side.

The emission part 20 is accommodated in an opening on the rear side (−Y) of the housing 10 and emits light to the rear side (−Y). The emission part 20 has a rod-shaped light guide body 25 extending in the leftward/rightward direction X, and a pair of light source devices 21 disposed on end portions on the right side and the left side of the light guide body 25. Further, FIG. 3 shows only one on the right side (+X) among the pair of light source devices 21.

The light guide body 25 is formed of, for example, a transparent resin such as polycarbonate, acryl, or the like, or a translucent material such as glass or the like. The light guide body 25 guides light emitted from the light source devices 21. The light guide body 25 curves in a bow shape toward the front side (+Y) as it goes toward the right side and the left side in the leftward/rightward direction X from the center. An incidence part 25*a* is provided on each end portion of the light guide body 25 in the leftward/rightward direction X. The incidence part 25*a* faces the light source device 21.

The light source device 21 has a board 21*a*, and an LED light source 21*b* mounted on the board 21*a*. The LED light source 21*b* emits light toward an incidence surface of the incidence part 25*a*. The light emitted from the LED light source 21*b* is guided into the light guide body 25 from the incidence part 25*a* in the leftward/rightward direction X. In addition, the light is substantially uniformly emitted to the rear side (−Y) from the entire length of the light guide body 25 by an action of reflection cuts (not shown) provided on a surface facing the front side (+Y) of the light guide body 25. Accordingly, the light guide body 25 emits light substantially uniformly throughout the entire length.

The inner lens 40 is located on the rear side (−Y) of the emission part 20. The inner lens 40 is a plate-shaped member formed of, for example, a transparent resin such as polycarbonate, acryl, or the like, or a translucent material such as glass or the like. The inner lens 40 is a lens through which the light emitted from the light guide body 25 is transmitted.

Figure 4:
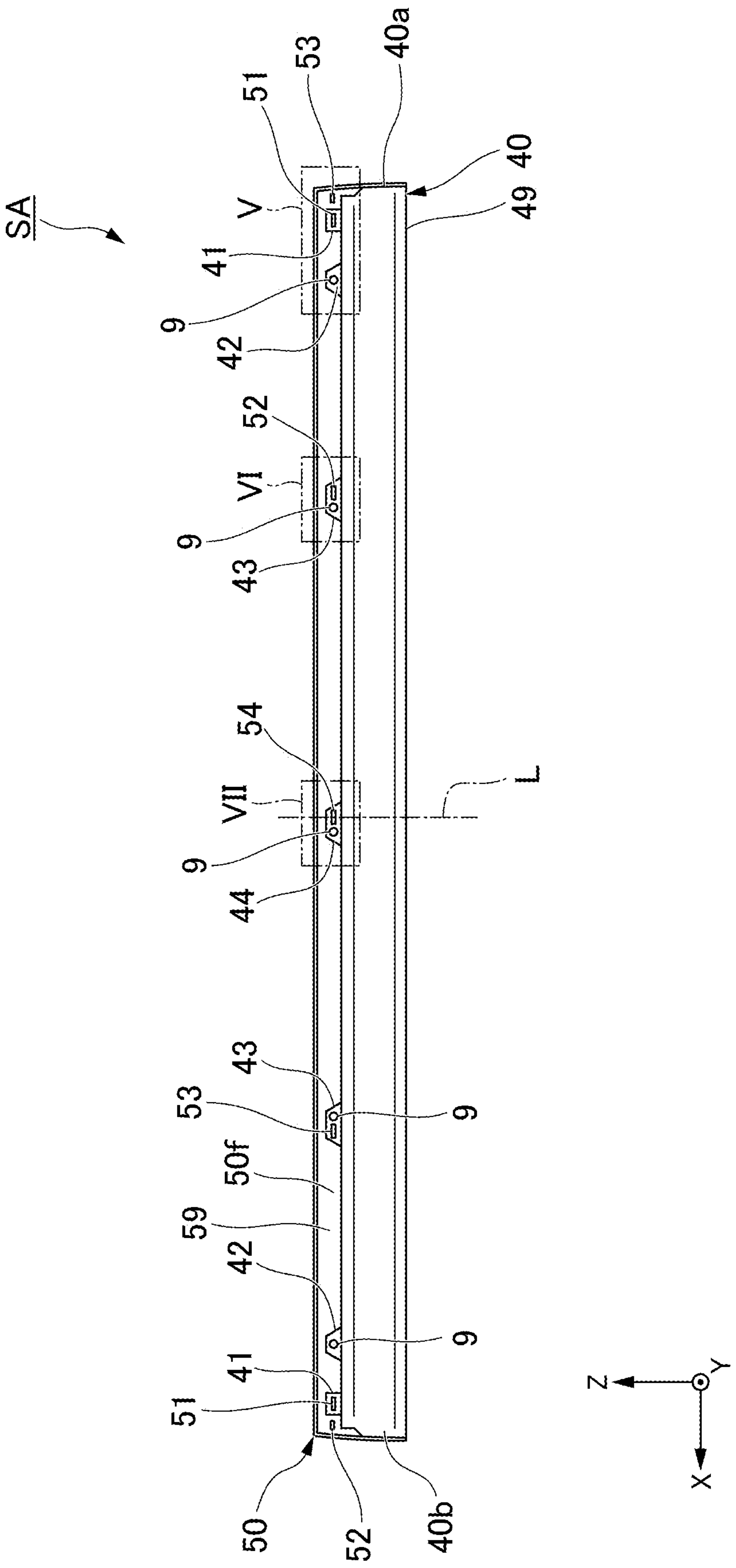
FIG. 4 is a view showing a semi-assembled product of an inner lens and an outer lens of the embodiment when seen from the front.

FIG. 4 is a view showing the inner lens 40 and the outer lens 50 when seen from the front side (+Z). In an assembly process of the lid lamp LID, the inner lens 40 and the outer lens 50 are fixed in advance to configure a semi-assembled product SA shown in FIG. 4.

The inner lens 40 has an inner lens main body portion 49, and a plurality of protrusion pieces 41, 42, 43 and 44 protruding upward from an edge of an upper end of the inner lens main body portion 49. The inner lens main body portion 49 extends in the leftward/rightward direction X. That is, the inner lens 40 is a diffusion lens extending in the leftward/rightward direction X and configured to diffuse the light emitted from the light guide body 25. In the embodiment, end portions 40*a* and 40*b* of the inner lens 40 are end portions of the inner lens main body portion 49 in the leftward/rightward direction X.

The protrusion pieces 41, 42, 43 and 44 are each plate-shaped and extend along a plane perpendicular to the forward/rearward direction Y. The plurality of protrusion pieces 41, 42, 43 and 44 are disposed side by side in the leftward/rightward direction. As described below, the protrusion pieces 41, 42, 43 and 44 are referred to as first protrusion pieces 41, second protrusion pieces (fixing parts) 42, third protrusion pieces (fixing parts) 43, and a fourth protrusion piece (fixing part) 44. The inner lens 40 has two first protrusion pieces 41, two second protrusion pieces 42, two third protrusion pieces 43, and a single fourth protrusion piece 44. The fourth protrusion piece 44 is disposed on the centerline L of the vehicular lighting tool 1 in the leftward/rightward direction X. The two first protrusion pieces 41 are laterally symmetrically disposed with reference to the centerline L. The two second protrusion pieces 42 are laterally symmetrically disposed with reference to the centerline L. The two third protrusion pieces 43 are laterally symmetrically disposed with reference to the centerline L. Accordingly, one first protrusion piece 41, one second protrusion piece 42, and one third protrusion piece 43 are disposed on the right side (+X) and the left side (−X) of the centerline L, respectively. The first protrusion pieces 41 are disposed on outer sides of the second protrusion pieces 42 and the third protrusion pieces 43 in the leftward/rightward direction X. The third protrusion pieces 43 are disposed on inner sides of the first protrusion pieces 41 and the second protrusion pieces 42 in the leftward/rightward direction X. The second protrusion pieces 42 are disposed between the first protrusion pieces 41 and the third protrusion pieces 43 in the leftward/rightward direction X.

Figure 5:
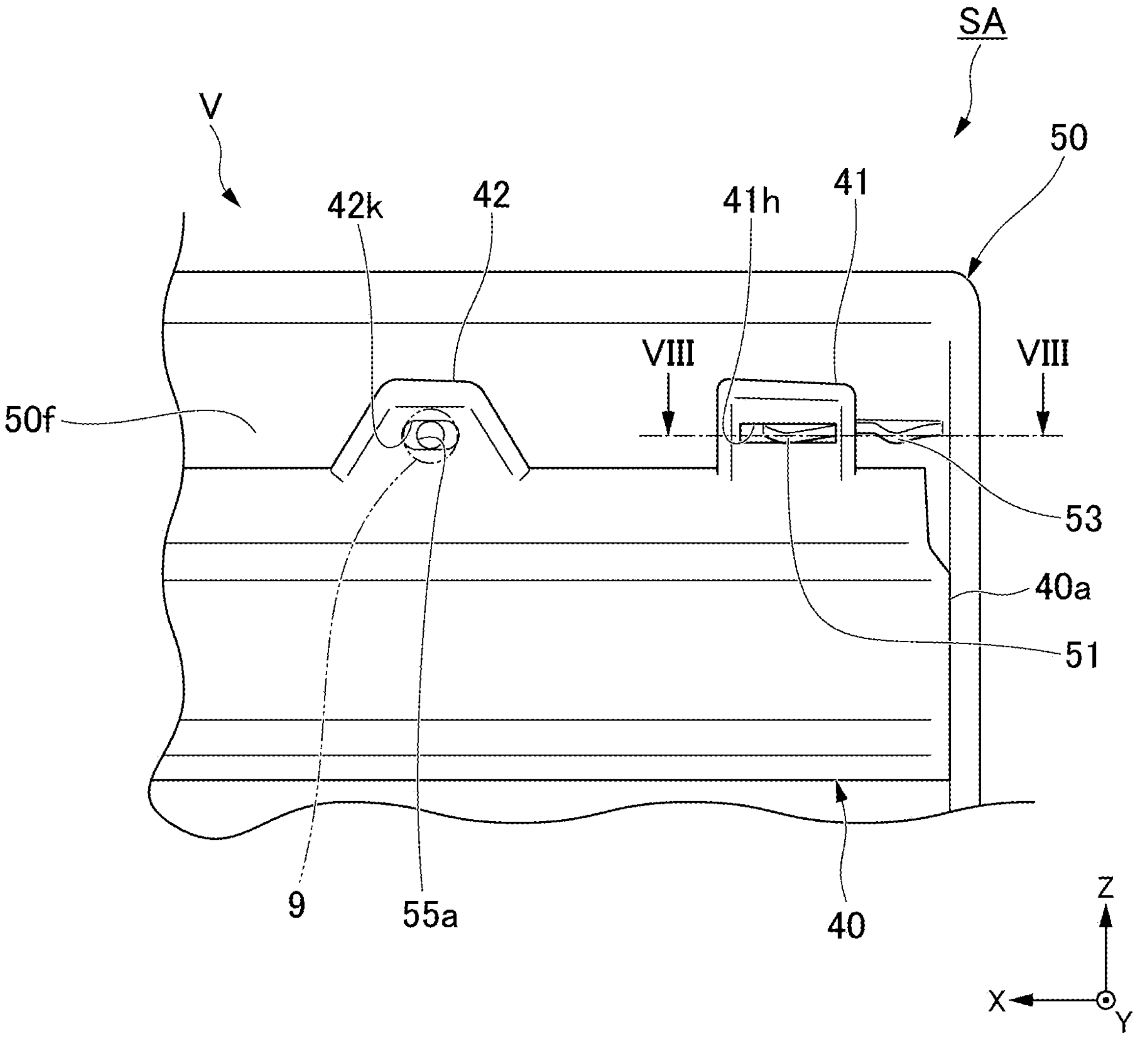
FIG. 5 is an enlarged view of a region V shown in FIG. 4.

FIG. 5 is an enlarged view of a region V shown in FIG. 4.

As shown in FIG. 5, the first protrusion piece 41 has a rectangular shape when seen in the forward/rearward direction Y. The first protrusion piece 41 has a first guide hole 41*h*. The first guide hole 41*h* passes through the first protrusion piece 41 in the forward/rearward direction. The first guide hole 41*h* has an elongated shape extending in the leftward/rightward direction with a uniform width dimension.

The second protrusion piece 42 has a trapezoidal shape when seen in the forward/rearward direction Y. The second protrusion piece 42 has a first fixing hole 42*k*. The first fixing hole 42*k* passes through the second protrusion piece 42 in the forward/rearward direction. The first fixing hole 42*k* has an elongated shape extending in the leftward/rightward direction with a uniform width dimension.

Figure 6:
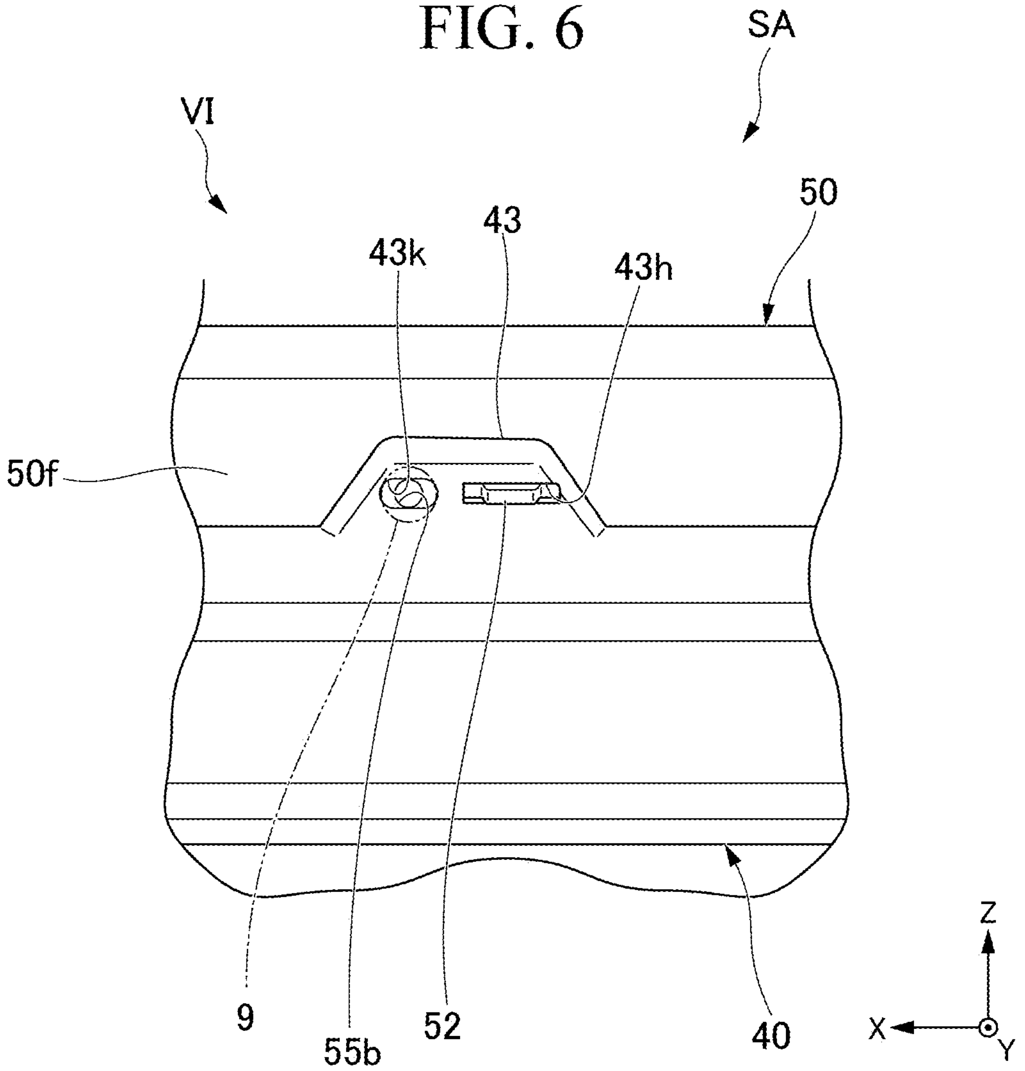
FIG. 6 is an enlarged view of a region VI shown in FIG. 4.

FIG. 6 is an enlarged view of a region VI shown in FIG. 4.

As shown in FIG. 6, the third protrusion piece 43 has a trapezoidal shape when seen in the forward/rearward direction Y. The third protrusion piece 43 has a second guide hole 43*h* and a second fixing hole 43*k*. The second guide hole 43*h* and the second fixing hole 43*k* are disposed side by side in the leftward/rightward direction X. The second fixing hole 43*k* is located on the inner side of the second guide hole 43*h* in the leftward/rightward direction X (the right side (+X) of the third protrusion piece 43 shown in FIG. 6). The second guide hole 43*h* and the second fixing hole 43*k* pass through the third protrusion pieces 43 in the forward/rearward direction. The second guide hole 43*h* has an elongated shape extending in the leftward/rightward direction with a uniform width dimension. In addition, the second fixing hole 43*k* has an elongated shape extending in the leftward/rightward direction with a uniform width dimension.

Figure 7:
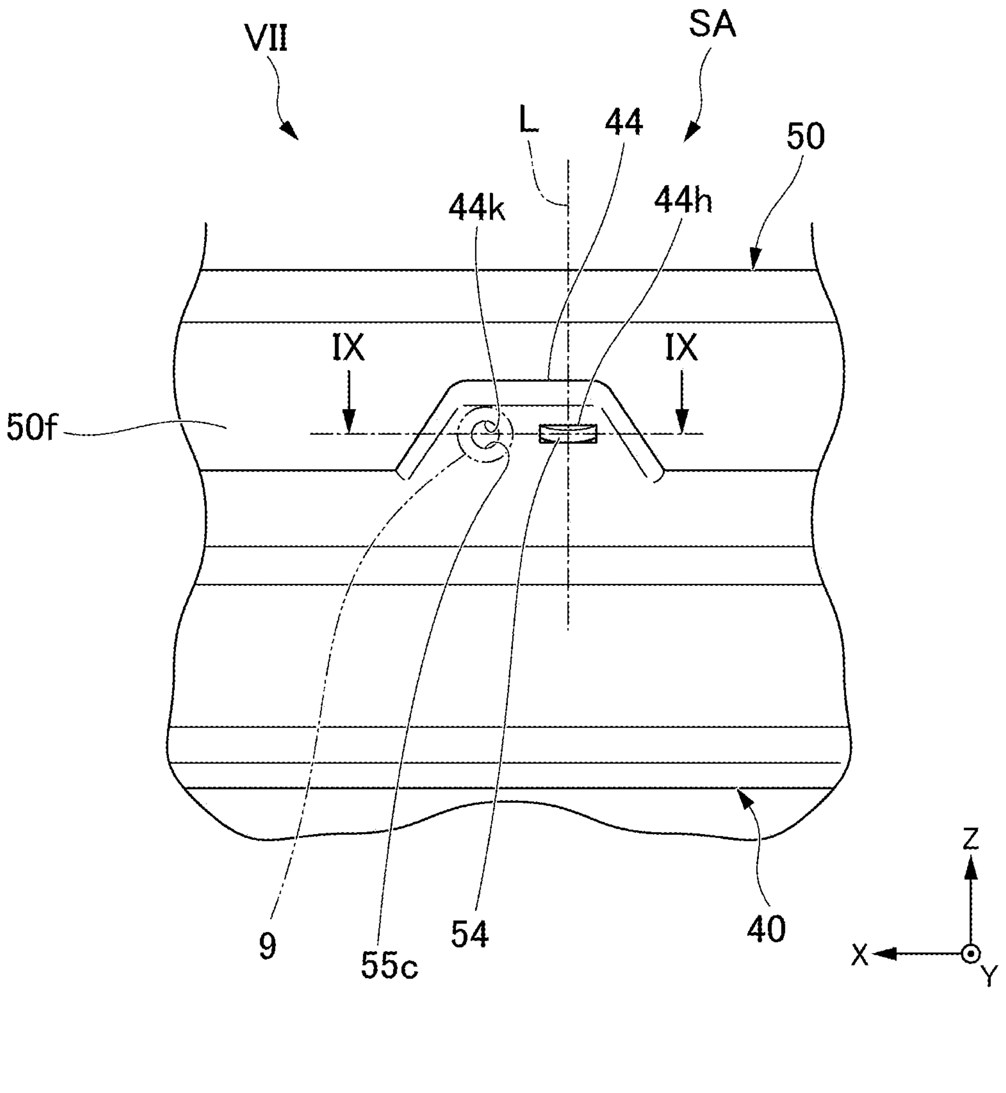
FIG. 7 is an enlarged view of a region VII shown in FIG. 4.

FIG. 7 is an enlarged view of a region VII shown in FIG. 4.

As shown in FIG. 7, the fourth protrusion piece 44 has a trapezoidal shape when seen in the forward/rearward direction Y. The fourth protrusion piece 44 has a positioning hole 44*h*, and a third fixing hole 44*k*. The positioning hole 44*h* and the third fixing hole 44*k* are disposed side by side in the leftward/rightward direction X. The third fixing hole 44*k* is disposed on the right side (+X) of the positioning hole 44*h*. The positioning hole 44*h* and the third fixing hole 44*k* pass through the fourth protrusion piece 44 in the forward/rearward direction. The positioning hole 44*h* has an elongated shape extending in the leftward/rightward direction with a uniform width dimension. The positioning hole 44*h* is disposed on the centerline L of the vehicular lighting tool 1 in the leftward/rightward direction X. In addition, the third fixing hole 44*k* has a circular shape.

The width dimensions of the first guide hole 41*h*, the second guide hole 43*h*, and the positioning hole 44*h* are equal to each other. In addition, lengthwise dimensions of the first guide hole 41*h* and the second guide hole 43*h* in the leftward/rightward direction X are equal to each other, and greater than a lengthwise dimension of the positioning hole 44*h* in the leftward/rightward direction X.

A fixing screw 9 configured to fix the inner lens 40 to the outer lens 50 is inserted through the first fixing hole 42*k*, the second fixing hole 43*k*, and the third fixing hole 44*k*. Accordingly, the second protrusion pieces 42, the third protrusion pieces 43, and the fourth protrusion piece 44 function as a fixing part fixed to the outer lens 50. The inner lens 40 has a plurality of fixing parts (the second protrusion pieces 42, the third protrusion pieces 43, and the fourth protrusion piece 44) arranged in the leftward/rightward direction X.

As shown in FIG. 3, the outer lens 50 is located on the rear side (−Y) of the inner lens 40. The outer lens 50 is a plate-shaped cover lens configured to cover the opening of the housing 10. The outer lens 50 protects each member of the lid lamp LID from the rear side (−Y). The outer lens 50 of the embodiment is formed of, for example, a transparent resin such as polycarbonate, acryl, or the like, and a resin material through which light cannot transmit, through two-tone molding. The outer lens 50 allows transmission of the light emitted from the inner lens 40 to the rear side (−Y) and emission of the light to the rear side of the vehicle 100. The inner lens 40 includes a transparent region 50A corresponding to the light emitting region A1, and a non-transparent region 50B that is a region other than the transparent region 50A. The transparent region 50A is formed of a transparent resin through which light passes, and the non-transparent region 50B is formed of a resin through which light does not pass, such as a black resin or the like. The transparent region 50A overlaps the light emitting region A1 when seen from the rear side (−Y). Meanwhile, when seen from the rear side (−Y), the non-transparent region 50B overlaps with the protrusion pieces 41, 42, 43 and 44, guide convex portions 51 and 52, a stopper convex portion 53, a positioning convex portion 54, and a plurality of fixing screws 9, shown in FIG. 4, making them less visible.

As shown in FIG. 3, the outer lens 50 has an outer lens main body portion 59, a pair of sidewall portions 58, a pair of inward protruding parts 57, and a fixing surface 50*f* (see FIG. 4). The sidewall portions 58 and the inward protruding parts 57 are provided on the right side and the left side of the outer lens 50, respectively. Further, FIG. 3 shows only one of the sidewall portions 58 and the inward protruding parts 57 located on the right side.

As shown in FIG. 4, the outer lens main body portion 59 extends in the leftward/rightward direction X. That is, the outer lens 50 extends in the leftward/rightward direction X. In addition, the fixing surface 50*f* is a surface facing the front side (+Y) of the outer lens main body portion 59. The fixing surface 50*f* has the four guide convex portions 51 and 52 protruding to the front side (+Y), the two stopper convex portions 53, and the positioning convex portion 54. That is, the outer lens 50 has the four guide convex portions 51 and 52, the two stopper convex portion 53, and the positioning convex portion 54. The four guide convex portions 51 and 52, the two stopper convex portions 53, and the positioning convex portion 54 are arranged in the leftward/rightward direction X. In the following description, when two disposed on the right side or two disposed on the left side of the centerline L of the four guide convex portions 51 and 52 are distinguished from each other, these are referred to as the first guide convex portions 51 and the second guide convex portions 52. The outer lens 50 of the embodiment has the two first guide convex portions 51 and the two second guide convex portions 52.

The positioning convex portion 54 is disposed on the centerline L of the vehicular lighting tool 1 in the leftward/rightward direction X. The two first guide convex portions 51 are laterally symmetrically disposed with reference to the centerline L. The two second guide convex portions 52 are laterally symmetrically disposed with reference to the centerline L. The two stopper convex portions 53 are laterally symmetrically disposed with reference to the centerline L. Accordingly, one first guide convex portion 51, one second guide convex portion 52, and one stopper convex portion 53 each are disposed on the right side (+X) and the left side (−X) of the centerline L. The stopper convex portion 53 is disposed on the outer side of the first guide convex portion 51 and the second guide convex portion 52 in the leftward/rightward direction X. The second guide convex portion 52 is disposed on the inner side of the first guide convex portion 51 and the stopper convex portion 53 in the leftward/rightward direction X.

As shown in FIG. 5, the first guide convex portion 51 and the stopper convex portion 53 each have a rib shape extending in the leftward/rightward direction X. A dimension of the first guide convex portion 51 in the leftward/rightward direction X is smaller than that of the first guide hole 41*h* in the leftward/rightward direction X. The first guide convex portion 51 is inserted into the first guide hole 41*h* in a state in which a gap is provided in the leftward/rightward direction X. That is, in a state in which the first guide convex portion 51 is inserted into the first guide hole 41*h*, a gap is provided between a right end of the first guide convex portion 51 and a right end of an inner edge of the first guide hole 41*h* and between a left end of the first guide convex portion 51 and a left end of an inner edge of the first guide hole 41*h*. Meanwhile, a dimension of the first guide convex portion 51 in the upward/downward direction Z is substantially the same as or slightly smaller than that of the first guide hole 41*h* in the upward/downward direction Z. Accordingly, by inserting the first guide convex portion 51 into the first guide hole 41*h*, the inner lens 40 is positioned with respect to the outer lens 50 in the upward/downward direction Z.

Figure 8:
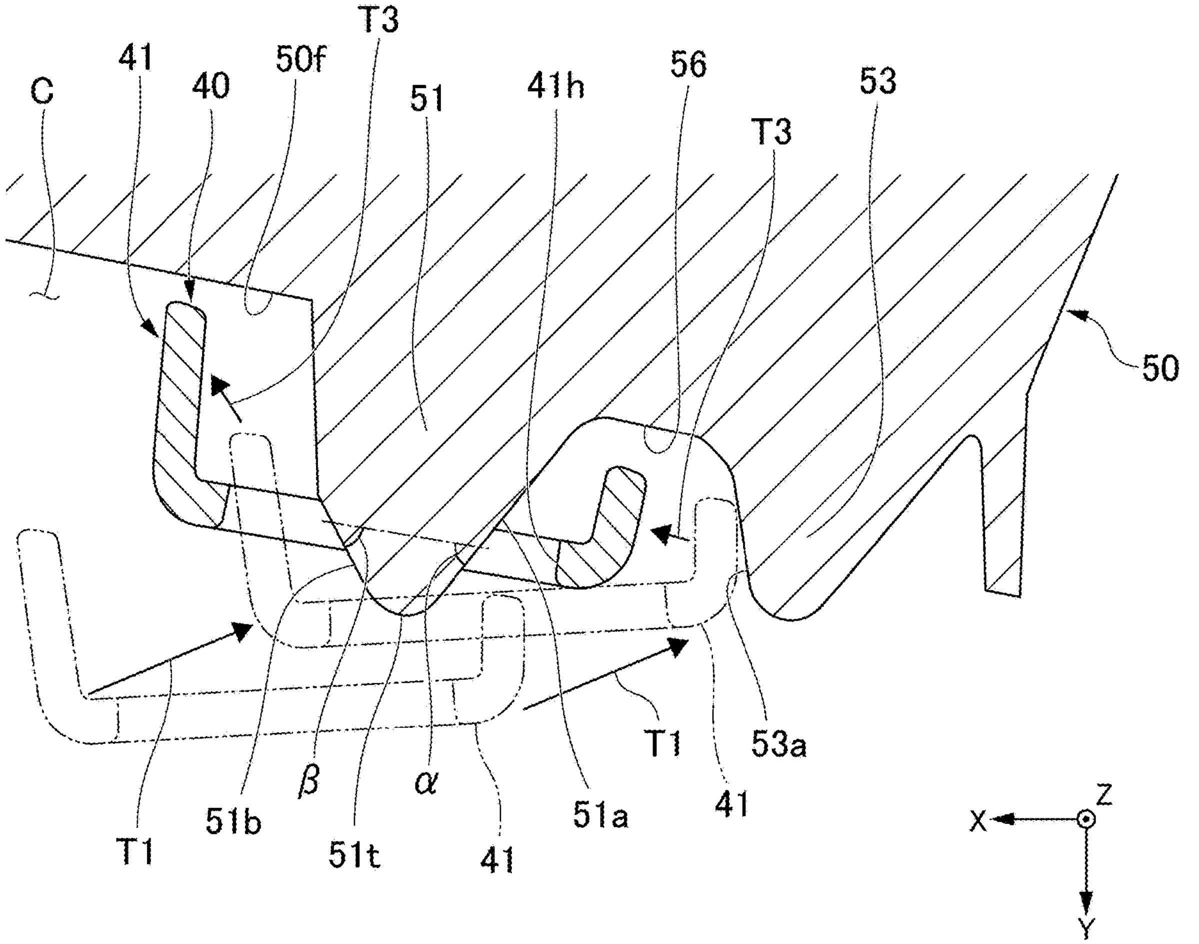
FIG. 8 is a cross-sectional view of a first guide convex portion, a stopper convex portion, and a first protrusion piece along line VIII-VIII in FIG. 5.

FIG. 8 is a cross-sectional view of the first guide convex portion 51, the stopper convex portion 53, and the first protrusion piece 41 along line VIII-VIII in FIG. 5. The first guide convex portion 51 has a tip portion 51*t*, a first inclined surface 51*a*, and a second inclined surface 51*b*. The tip portion 51*t* is a portion located on the rearmost side (−Y) in the first guide convex portion 51.

The first inclined surface 51*a* is located on the outer side of the tip portion 51*t* in the leftward/rightward direction X (the right side (+X) in the first guide convex portion 51 in FIG. 8). The first inclined surface 51*a* is inclined in a direction toward the front side (+Y) as it goes to the outside in the leftward/rightward direction X. The second inclined surface 51*b* is located on the inner side of the tip portion 51*t* in the leftward/rightward direction X (the left side (−X) in the first guide convex portion 51 in FIG. 8). The second inclined surface 51*b* is inclined in a direction toward the front side (+Y) as it goes toward the inner side in the leftward/rightward direction X. An inclination angle α of the first inclined surface 51*a* with respect to the leftward/rightward direction X is greater than an inclination angle R of the second inclined surface 51*b* with respect to the leftward/rightward direction. Further, the inclination angle with respect to the leftward/rightward direction X means an angle with respect to the Y axis extending in the leftward/rightward direction X when the vehicular lighting tool 1 is seen in the upward/downward direction Z. In the embodiment, the first inclined surface 51*a* and the second inclined surface 51*b* extend linearly together when seen in the upward/downward direction Z. The first inclined surface 51*a* and the second inclined surface 51*b* may be curved.

As shown in FIG. 5, the stopper convex portion 53 is located on the outer side of the first guide convex portion 51 in the leftward/rightward direction X (the left side (−X) in the stopper convex portion 53 shown in FIG. 5). In a state in which the first guide convex portion 51 is inserted into the first guide hole 41*h*, the stopper convex portion 53 is disposed on the outer side of the first protrusion pieces 41 in the leftward/rightward direction X.

As shown in FIG. 8, a concave portion 56 recessed to the front side (+Y) is formed between the stopper convex portion 53 and the first guide convex portion 51.

As shown in FIG. 6, the second guide convex portion 52 has a rib shape extending in the leftward/rightward direction X. A dimension of the second guide convex portion 52 in the leftward/rightward direction X is smaller than that of the second guide hole 43*h* in the leftward/rightward direction X. The second guide convex portion 52 is inserted into the second guide hole 43*h* of the third protrusion piece 43 in a state in which a gap is provided in the leftward/rightward direction X. A dimension of the second guide convex portion 52 in the upward/downward direction Z is substantially the same as or slightly smaller than that of the second guide hole 43*h* in the upward/downward direction Z. Accordingly, the inner lens 40 is positioned with respect to the outer lens 50 in the upward/downward direction Z. Further, while not shown, the second guide convex portion 52 has a tip portion, a first inclined surface, and a second inclined surface, which are the same as those of the first guide convex portion 51 shown in FIG. 8.

As shown in FIG. 7, the positioning convex portion 54 has a rib shape extending in the leftward/rightward direction X. The positioning hole 44*h* is disposed on the centerline L of the vehicular lighting tool 1 in the leftward/rightward direction X. A dimension of the positioning convex portion 54 in the leftward/rightward direction X is substantially the same as or slightly smaller than that of the positioning hole 44*h* in the leftward/rightward direction X. Accordingly, by inserting the positioning convex portion 54 into the positioning hole 44*h*, the inner lens 40 is positioned with respect to the outer lens 50 in the leftward/rightward direction X. In addition, a dimension of the positioning convex portion 54 in the upward/downward direction Z is substantially the same as or slightly smaller than that of the positioning hole 44*h* in the upward/downward direction Z. Accordingly, the inner lens 40 is positioned with respect to the outer lens 50 in the upward/downward direction Z.

Figure 9:
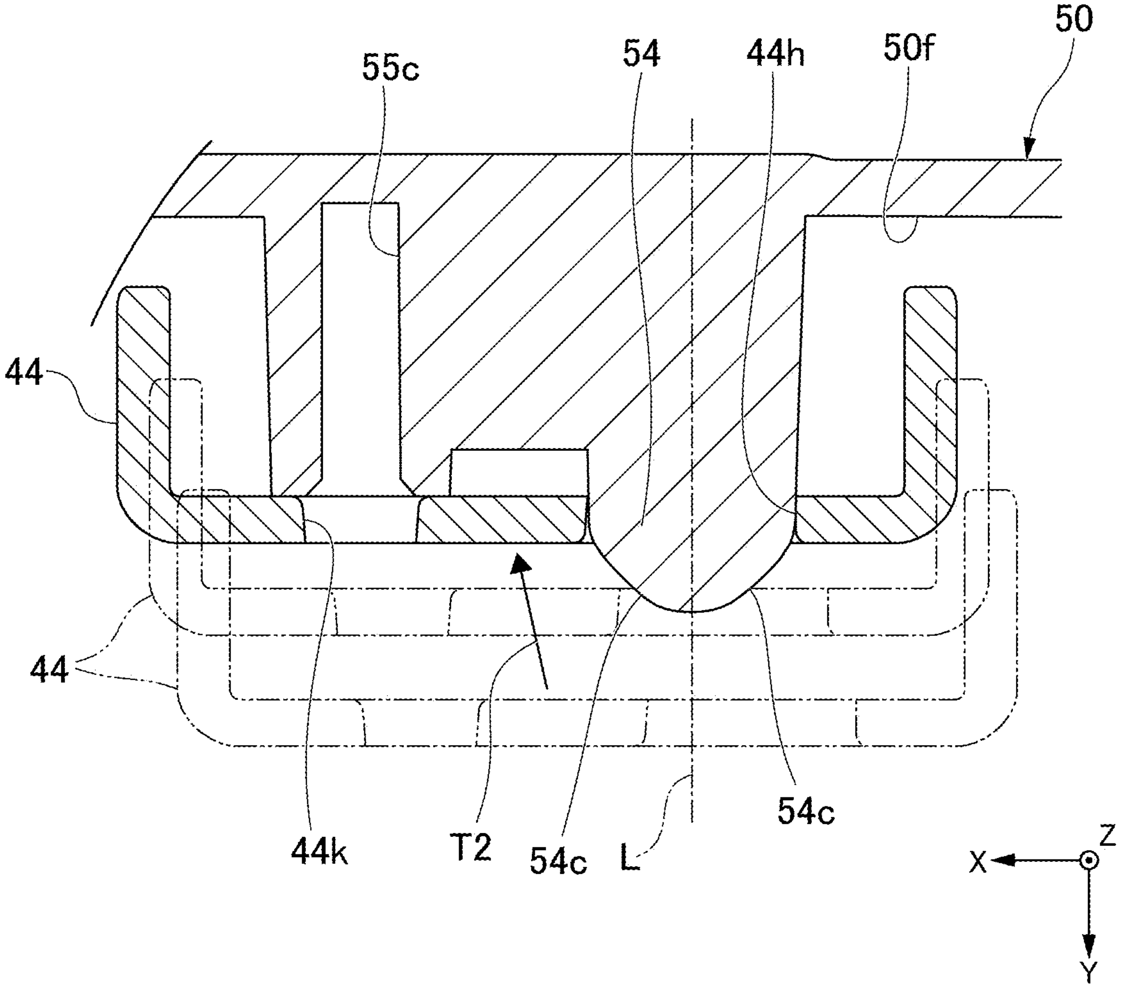
FIG. 9 is a cross-sectional view of a positioning convex portion and a fourth protrusion piece along line IX-IX in FIG. 7.

FIG. 9 is a cross-sectional view of the positioning convex portion 54 and the fourth protrusion piece 44 along line IX-IX in FIG. 5. The positioning convex portion 54 has a laterally symmetrical shape with reference to the centerline L. A tapered surface configured to guide insertion of the positioning convex portion 54 may be provided on a tip portion of the positioning convex portion 54.

A first screw hole 55*a* overlapping the first fixing hole 42*k* as shown in FIG. 5, a second screw hole 55*b* overlapping the second fixing hole 43*k* as shown in FIG. 6, and a third screw hole 55*c* overlapping the third fixing hole 44*k* as shown in FIG. 7 are provided in the fixing surface 50*f* of the outer lens 50. The fixing screws 9 are fastened to the first screw hole 55*a*, the second screw hole 55*b*, and the third screw hole 55*c*, respectively.

As shown in FIG. 3, the sidewall portions 58 extend toward the front side (+Y) from the end portions of the outer lens 50 in the leftward/rightward direction X, respectively. The inner lens 40 is disposed between the pair of sidewall portions 58 in the leftward/rightward direction X. Further, while not shown, the outer lens 50 further has an upper wall portion configured to cover the inner lens 40 from above, and a lower wall portion configured to cover the inner lens 40 from below. Accordingly, the inner lens 40 is disposed between the upper wall portion and the lower wall portion in the upward/downward direction Z. For this reason, the outer lens 50 surrounds the inner lens 40 on the upper, lower, left, right, and rear sides (−Y). That is, the outer lens 50 forms an accommodating space C configured to accommodate the inner lens 40.

The inward protruding parts 57 protrude inward in the leftward/rightward direction X from end portions on the front side (+Y) of the sidewall portions 58, respectively. The inward protruding parts 57 protrude toward each other in the leftward/rightward direction X (inward of the leftward/ rightward direction X). Front end portions 57*a* of the inward protruding parts 57 are joined to a rear end portion 12*a* of the frame-shaped portion 12 of the housing 10. In the embodiment, the front end portions 57*a* of the inward protruding parts 57 and the rear end portion 12*a* of the frame-shaped portion 12 are joined by hot plate welding. Further, the outer lens 50 is welded to the housing 10 not only at the inward protruding parts 57 but also at the upper wall portion and the lower wall portion (not shown) located above and below the inner lens 40.

Accordingly, the outer lens 50 is welded and fixed to the housing 10 throughout the entire circumference of the opening on the front side (+Y). The welding method of the inward protruding parts 57 and the frame-shaped portion 12 is not limited to the embodiment, and, for example, may be laser welding or ultrasonic welding.

The sidewall portions 58 have inner side surfaces 58*f*. The inner side surfaces 58*f* of the sidewall portions 58 located on the right side (+X) are surfaces facing the left side (−X). In addition, the inner side surface 58*f* of the sidewall portion 58 (not shown in FIG. 3) located on the left side (−X) in the sidewall portions 58 is a surface facing the right side (+X).

According to the embodiment, by employing a structure configured to fix the inner lens 40 to the outer lens 50, the inner lens 40 can be disposed so as to overlap the welding portion of the housing 10 and the outer lens 50 (i.e., the rear end portion 12*a* and the front end portions 57*a*) in the forward/rearward direction Y, and the inner lens 40 can be enlarged in the leftward/rightward direction X.

Accordingly, it is possible to bring the end portion 40*b* of the inner lens 40 in the leftward/rightward direction X closer to the rear combination lamps RCL, and it is possible to make the light emitting region A1 of the lid lamp LID and the light emitting region A2 of the rear combination lamps RCL appear integrated.

(Method of Assembling Vehicular Lighting Tool)

Next, a method of assembling the vehicular lighting tool 1 of the embodiment will be described. The method of assembling the vehicular lighting tool 1 described below is a part of a method of manufacturing the vehicular lighting tool 1. The method of assembling the vehicular lighting tool 1 has a lens assembly process of fixing the inner lens 40 to the outer lens 50 and assembling the semi-assembled product SA. The lens assembly process of the embodiment has at least a first process, a second process, and a third process.

As shown in FIG. 3, the inner lens 40 of the embodiment is fixed to the outer lens 50 accommodated in the accommodating space C. According to the embodiment, the end portion 40*a* of the inner lens 40 in the leftward/rightward direction X overlaps the inward protruding part 57 in the forward/rearward direction Y. For this reason, in the lens assembly process of the embodiment, after disposing the end portion (hereinafter, the first end portion 40*a*) of the inner lens 40 on the left side (−X) in the accommodating space C, the end portion (hereinafter, the second end portion 40*b*) on the right side (+X) is disposed in the accommodating space C. Hereinafter, the assembly process of the embodiment will be described in more detail. Further, as described above, the inner lens 40 and the outer lens 50 of the embodiment have a laterally symmetrical shape with reference to the centerline L of the vehicular lighting tool 1. Accordingly, the lens assembly process of the embodiment may be performed in a laterally reversed sequence. More specifically, the lens assembly process may be performed in sequence of disposing the second end portion 40*b* of the inner lens 40 in the accommodating space C, and then, disposing the first end portion 40*a* in the accommodating space C.

Figure 10:
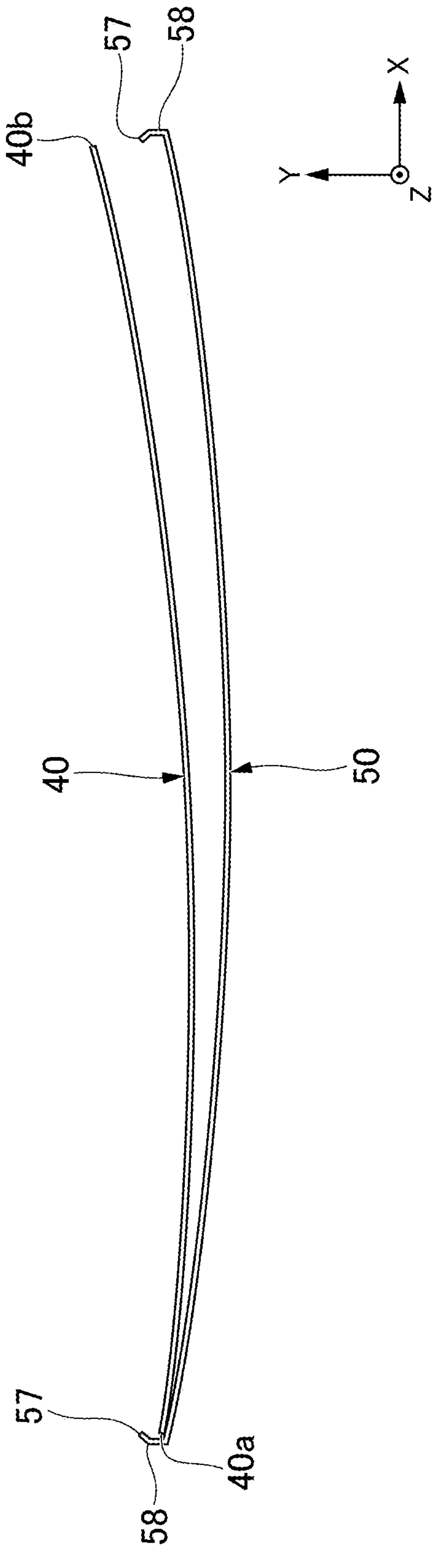
FIG. 10 is a cross-sectional schematic view for describing a first process of a lens assembly process of the embodiment.
Figure 11:
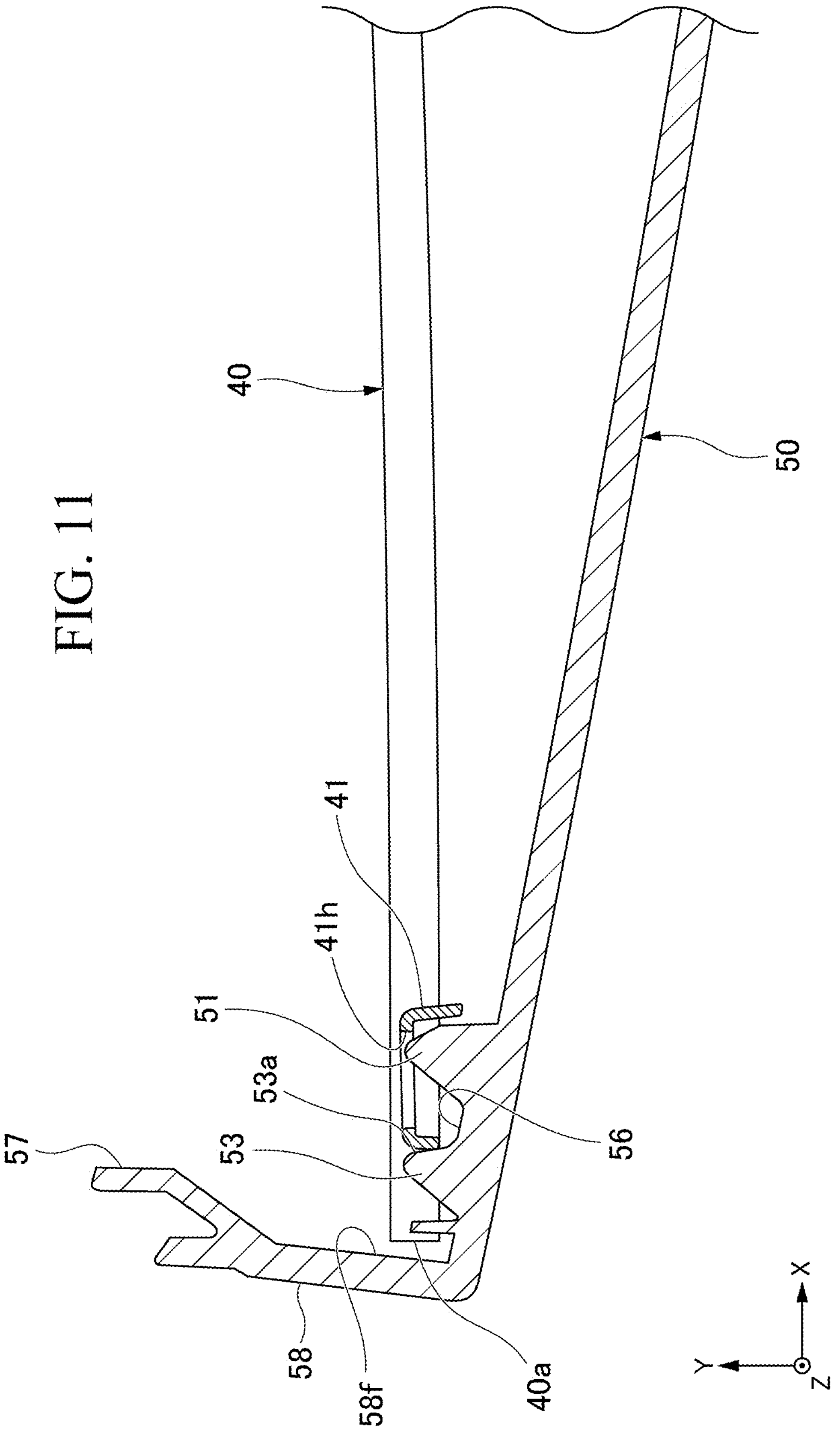
FIG. 11 is a partially enlarged view of FIG. 10.

FIG. 10 is a cross-sectional schematic view for describing the first process of the lens assembly process. FIG. 11 is a partially enlarged view of FIG. 10. As shown in FIG. 10, in the first process, only the first end portion 40*a* is inserted into the accommodating space C, and the second end portion 40*b* is disposed on the outer side of the accommodating space C (the front side (+Y) of the accommodating space C).

As shown in FIG. 11, after the first process, the first end portion 40*a* faces the inner side surfaces 58*f* of the sidewall portions 58. In addition, in the first process, an operator or an assembly device (hereinafter simply referred to as the operator) abuts the first protrusion pieces 41 on the left side (−X) of the inner lens 40 against a restricting surface 53*a* of the stopper convex portion 53 on the left side (−X) of the outer lens 50. Further, the operator inserts the first guide convex portion 51 into the first guide hole 41*h*.

FIG. 8 shows a first trajectory T1 of the first protrusion piece 41 in the first process. As shown by the first trajectory T1, in the first process, the operator can place the end portion of the first protrusion pieces 41 on the left side (−X) in the concave portion 56, so that the first guide convex portion 51 faces the first guide hole 41*h* in the forward/rearward direction Y, allowing easy insertion. In the first process, the inner lens 40 is inserted into the accommodating space C by moving the first end portion 40*a* toward the sidewall portions 58 of the outer lens 50 (i.e., to the left side (−X)). Accordingly, in the first process, the first protrusion piece 41 moves in a direction along the first inclined surface 51*a* of the first guide convex portion 51. The first inclined surface 51*a* of the embodiment is inclined by the inclination angle α along the first trajectory T1 of the first protrusion piece 41 in the first process.

In the first process, the first protrusion piece 41 is brought into contact with the restricting surface 53*a* of the stopper convex portion 53, which is located on the left side (−X) of the first guide convex portion 51. For this reason, the first guide convex portion 51 after the first process is biased toward the region of the first guide hole 41*h* on the right side. That is, in a state after the first process, a gap formed between the end portion of the first guide convex portion 51 on the right side and the end portion of the inner edge of the first guide hole 41*h* on the right side is smaller than a gap formed between the end portion of the first guide convex portion 51 on the left side and the end portion of the inner edge of the first guide hole 41*h* on the left side. Accordingly, the operator can position the first end portion 40*a* of the inner lens 40 close to and facing the sidewall portions 58 without contacting the sidewall portions 58.

Figure 12:
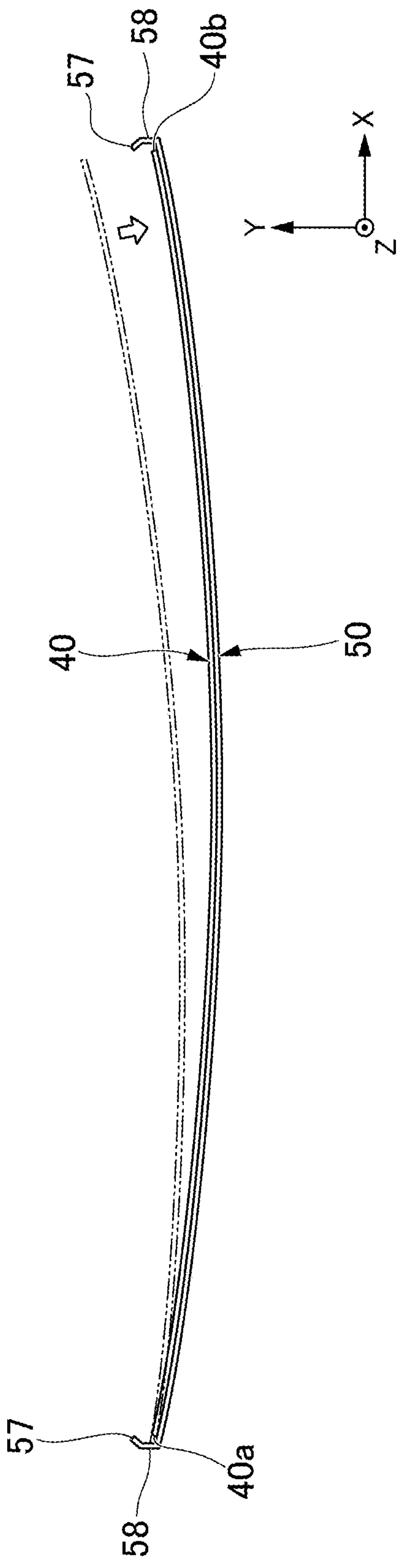
FIG. 12 is a cross-sectional schematic view for describing a second process of the lens assembly process of the embodiment.
Figure 13:
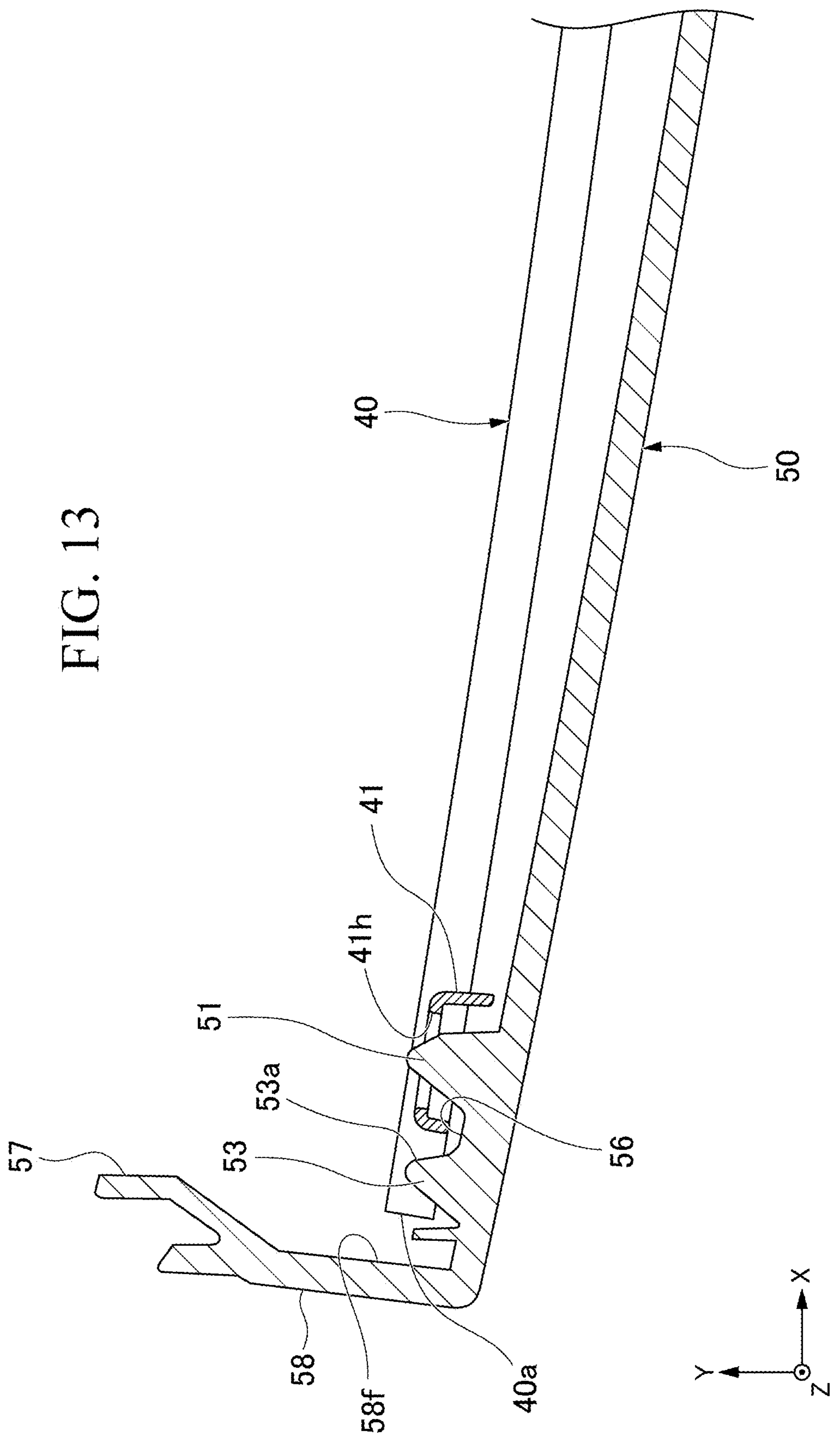
FIG. 13 is a partially enlarged view of FIG. 12.

FIG. 12 is a cross-sectional schematic view for describing the second process of the lens assembly process. FIG. 13 is a partially enlarged view of FIG. 12. As shown in FIG. 12, in the second process, the operator rotates the inner lens 40 to move the second end portion 40*b* to the rear side (−Y) so that the second end portion 40*b* is accommodated in the accommodating space C. As shown in FIG. 13, the second process is performed while keeping the first guide convex portion 51 inserted into the first guide hole 41*h*.

In the second process of the embodiment, in a state in which the first end portion 40*a* of the inner lens 40 is located close to the sidewall portions 58 of the outer lens 50, the second end portion 40*b* is moved to the rear side (−Y). For this reason, in the second process, until the positioning convex portion 54 is inserted into the positioning hole 44*h*, the inner lens 40 is positioned biased toward the region of the accommodating space C on the left side (−X), and the first end portion 40*a* is located on the left side (−X) of the inward protruding part 57 on the left side (−X). According to the second process of the embodiment, by positioning the first end portion 40*a* on the left side of the inward protruding parts 57 on the left side (−X) inside the accommodating space C and moving the second end portion 40*b* to the rear side (−Y), the second end portion 40*b* can be positioned in the accommodating space C without interfering with the inward protruding part 57 on the right side.

FIG. 9 shows a second trajectory T2 of the fourth protrusion piece 44 of the inner lens 40 in the second process. In the second process, as shown by the second trajectory T2, the second end portion 40*b* of the inner lens 40 moves to the front side and the rear side (−Y), and the positioning convex portion 54 is inserted into the positioning hole 44*h*. In a state before the second process (i.e., state after the first process), the positioning convex portion 54 and the positioning hole 44*h* face the forward/rearward direction Y, but are slightly shifted in the leftward/rightward direction X. Since a tapered surface 54*c* is provided on a tip of the positioning convex portion 54 of the embodiment, even if the center of the positioning convex portion 54 is misaligned with the center of the positioning hole 44*h*, the positioning convex portion 54 is guided into the positioning hole 44*h*. By inserting the positioning convex portion 54 into the positioning hole 44*h*, the inner lens 40 is positioned with respect to the outer lens 50 in the leftward/rightward direction X.

FIG. 8 shows a third trajectory T3 of the first protrusion pieces 41 in the second process. By inserting the positioning convex portion 54 into the positioning hole 44*h* and positioning the inner lens 40 with respect to the outer lens 50, the inner lens 40 is moved to the right side (+X).

The second inclined surface 51*b* of the first guide convex portion 51 is formed at the inclination angle R along the third trajectory T3 of the first protrusion pieces 41 in the second process. In the second process, the first guide convex portion 51 is inserted into the first guide hole 41*h* while guiding the inner edge of the first guide hole 41*h* to the second inclined surface 51*b*.

In the third process of the lens assembly process, the operator fixes the inner lens 40 to the outer lens 50. More specifically, as shown in FIG. 4, the protrusion pieces 41, 42, 43 and 44 of the inner lens 40 are fixed to a surface of the outer lens 50 facing the front side (+Y) using the fixing screw 9. After the process described above, the semi-assembled product SA in which the inner lens 40 and the outer lens 50 are integrated is manufactured.

Conclusion of Embodiment

According to the above-mentioned configuration, the end portions 40*a* and 40*b* of the inner lens 40 in the leftward/rightward direction X can be disposed while overlapping the inward protruding parts 57 in the forward/rearward direction Y on the rear side (−Y) of the inward protruding parts 57 of the outer lens 50. For this reason, the end portions 40*a* and 40*b* of the inner lens 40 can be disposed with respect to the inward protruding parts 57 on the outer side in the leftward/rightward direction X. Eventually, the dimension of the inner lens 40 in the leftward/rightward direction X can be increased, and when lamps such as the rear combination lamps RCL are arranged on both sides of the inner lens 40 in the leftward/rightward direction X, the light emitting region A1 can be easily seen continuous with the light emitting region A2.

In addition, according to the above-mentioned configuration, the end portions 40*a* and 40*b* of the inner lens 40 of the lid lamp LID in the leftward/rightward direction X can be brought closer to the rear combination lamps RCL. Accordingly, it is possible to realize the vehicular lighting tool 1 in which the light emitting regions A1 and A2 of the lid lamp LID and the rear combination lamps RCL are shown as an integrated unit.

As described above, while the embodiment of the present invention and variants thereof have been described, the configurations and combinations thereof in the embodiment and variants are merely examples, and additions, omissions, substitutions and other modifications of the configurations are possible without departing from the scope of the present invention. In addition, the present invention is not limited by the embodiment.

For example, in the above-mentioned embodiment, the case in which the plurality of guide holes are provided in the inner lens and the plurality of guide convex portions are provided in the outer lens has been described. However, the number of guide holes and guide convex portions is not limited to the above-mentioned embodiment, and these may be provided on the inner lens and the outer lens, respectively.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicular lighting tool that is located on a rear end portion of a vehicle and that is configured to emit light to a side behind the vehicle, the vehicular lighting tool comprising:
- an emission part configured to emit light to a rear side;
- an inner lens that is located on a rear side of the emission part and that is extending in a leftward/rightward direction; and
- an outer lens that is located on a rear side of the inner lens and that is extending in the leftward/rightward direction,
- wherein the outer lens comprises:
- a guide convex portion and a positioning convex portion that are arranged in the leftward/rightward direction and protruding forward;
- sidewall portions extending forward from end portions of the outer lens in the leftward/rightward direction, respectively; and
- inward protruding parts protruding inward in the leftward/rightward direction from end portions of the sidewall portions on the front side,
- wherein the inner lens comprises:
- a fixing part fixed to the outer lens; and
- a guide hole and a positioning hole passing through the inner lens in a forward/rearward direction of the vehicle,
- wherein end portions of the inner lens in the leftward/rightward direction face the sidewall portions with a gap therebetween and overlap the inward protruding parts in the forward/rearward direction,
- the guide convex portion is inserted into the guide hole in a state in which gaps are provided in the leftward/rightward direction, and
- the inner lens is positioned in the leftward/rightward direction with respect to the outer lens by the positioning convex portion being inserted into the positioning hole.

2. The vehicular lighting tool according to claim 1, wherein the guide convex portion is located at a first side in the leftward/rightward direction with respect to the positioning convex portion, the outer lens has a stopper convex portion located at the first side of the guide convex portion, the inner lens comprises a protrusion piece that is protruding toward the inner lens in an upward/downward direction and in which the guide hole is provided, and a concave portion recessed forward is formed between the guide convex portion and the stopper convex portion.

3. The vehicular lighting tool according to claim 1, wherein the guide convex portion is located at a first side in the leftward/rightward direction with respect to the positioning convex portion, the guide convex portion comprises:

a tip portion;

a first inclined surface located at the first side with respect to the tip portion; and a second inclined surface located at a second side, which is opposite to the first side, with respect to the tip portion, wherein the first inclined surface is inclined in a direction toward a front side as it goes toward the first side, the second inclined surface is inclined in a direction toward a front side as it goes toward the second side, and an inclination angle of the first inclined surface with respect to the leftward/rightward direction is greater than an inclination angle of the second inclined surface with respect to the leftward/rightward direction.

4. The vehicular lighting tool according to claim 1, wherein the outer lens has a plurality of guide convex portions disposed on both sides in the leftward/rightward direction with respect to the positioning convex portion, and the inner lens has a plurality of guide holes disposed on both sides in the leftward/rightward direction with respect to the positioning hole.

5. The vehicular lighting tool according to claim 4, wherein the positioning convex portion is located at a center of the outer lens in the leftward/rightward direction, and the positioning hole is located at a center of the inner lens in the leftward/rightward direction.

6. The vehicular lighting tool according to claim 1, further comprising:

a housing that opens on a rear side and that accommodates the emission part, wherein the inward protruding part is welded to the housing on a front end portion of the housing.

7. The vehicular lighting tool according to claim 1, further comprising:

a lid lamp mounted on a trunk lid of the vehicle comprising the emission part, the inner lens, and the outer lens; and a pair of rear combination lamps arranged and disposed on a right side and a left side of the lid lamp, respectively.

8. A method of manufacturing a vehicular lighting tool that is located on a rear end portion of a vehicle and that is configured to emit light to a side behind the vehicle, the method comprising:

a lens assembly process of fixing an inner lens, which is extending in a leftward/rightward direction, to an outer lens which is located on a rear side of the inner lens and which is extending in the leftward/rightward direction, wherein the outer lens comprises:

a guide convex portion and a positioning convex portion that are arranged in the leftward/rightward direction and protruding forward;

sidewall portions extending forward from end portions of the outer lens in the leftward/rightward direction, respectively; and inward protruding parts protruding inward in the leftward/rightward direction from end portions of the sidewall portions on the front side, wherein the inner lens comprises:

a guide hole and a positioning hole passing through the inner lens in a forward/rearward direction of the vehicle, wherein the guide convex portion is located at a first side in the leftward/rightward direction with respect to the positioning convex portion, wherein the lens assembly process comprises:

a first process of making a first end portion, which is located on the first side of the inner lens, to face an inner side surface of the sidewall portion and inserting the guide convex portion into the guide hole in a state in which the first end portion is located on a front side of a second end portion located on a second side which is opposite to the first side, a second process of moving the second end portion to a rear side while maintaining a state in which the guide convex portion is inserted into the guide hole, and inserting the positioning convex portion into the positioning hole; and a third process of fixing the inner lens to the outer lens, wherein, in the first process, the guide convex portion is inserted into the guide hole in a state in which a gap is provided in the leftward/rightward direction, and in the second process, by inserting the positioning convex portion into the positioning hole, the inner lens is positioned with respect to the outer lens in the leftward/rightward direction.

* * * * *